US012654413B2

(12) United States Patent
Hutchison et al.

(10) Patent No.: US 12,654,413 B2
(45) Date of Patent: Jun. 16, 2026

(54) MACHINE PRESS ADAPTOR

(71) Applicant: Snap-on Incorporated, Kenosha, WI (US)

(72) Inventors: Allen M. Hutchison, Kenosha, WI (US); William J. Powell, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 607 days.

(21) Appl. No.: 17/373,026

(22) Filed: Jul. 12, 2021

(65) Prior Publication Data

US 2023/0010913 A1 Jan. 12, 2023

(51) Int. Cl.
*B30B 15/02* (2006.01)

(52) U.S. Cl.
CPC .................................. *B30B 15/026* (2013.01)

(58) Field of Classification Search
CPC ...... B21D 28/34–36; B25B 27/06–064; B30B 15/026; Y10T 29/53704; Y10T 29/53843; Y10T 29/53678; Y10T 29/53657; Y10T 83/9483; Y10T 83/8867; Y10T 83/9476; Y10T 83/9488
See application file for complete search history.

(56) References Cited

U.S. PATENT DOCUMENTS 1,498,638 A * 6/1924 Periolat .................. B25B 5/101 269/282
2,993,310 A 7/1961 Nowell
3,217,394 A 11/1965 Castoe
3,238,608 A 3/1966 Davis
3,734,515 A 5/1973 Dudek
4,409,720 A 10/1983 Boudreau
4,977,660 A * 12/1990 Maynard ................. F16D 3/405 29/257
5,033,283 A * 7/1991 Gloe ..................... B30B 15/026 72/482.2
5,699,600 A 12/1997 Choi
5,836,078 A 11/1998 Alken et al.
5,898,985 A 5/1999 Villarreal
5,992,285 A 11/1999 Talarico
6,109,619 A * 8/2000 Fine ...................... B23B 31/008 407/29.15
6,276,247 B1 8/2001 Helda
6,782,777 B1 8/2004 Wei
7,044,028 B1 * 5/2006 Lozano ............... B25B 23/0021 81/177.85

(Continued)

FOREIGN PATENT DOCUMENTS

CN 109476045 A 3/2019
DE 1777363 A1 12/1972

(Continued)

OTHER PUBLICATIONS

Pierik, Richard. "Make 12 Ton Shop Press Tooling". May 8, 2019. YouTube. https://www.youtube.com/watch?v=ieW_IDcp5Yk&t=1148s (Year: 2019).*

(Continued)

*Primary Examiner* — Tyrone V Hall, Jr.
(74) *Attorney, Agent, or Firm* — Taft, Stettinius & Hollister LLP

(57) ABSTRACT

An adaptor for a press. The adaptor includes a body adapted to removably couple to the press cylinder or carriage of the press and an extension shaft having first and second opposing ends. The first end is removably coupled to the body, and the second end is adapted to couple to a drive adaptor.

15 Claims, 3 Drawing Sheets

(56) References Cited

U.S. PATENT DOCUMENTS

| | | | |
|---|---|---|---|
| 7,191,504 | B1 | 3/2007 | Charron |
| 7,610,664 | B2 | 11/2009 | Lionberg |
| 7,669,305 | B1 | 3/2010 | Lionberg |
| 7,890,305 | B2 | 2/2011 | Lionberg |
| 7,895,723 | B2 | 3/2011 | Lionberg |
| 8,156,625 | B2 | 4/2012 | Lionberg |
| 2003/0126957 | A1 | 7/2003 | Huang |
| 2006/0085964 | A1 | 4/2006 | Brown |
| 2009/0013833 | A1 | 1/2009 | Salanda |
| 2009/0266209 | A1 | 10/2009 | Thielges et al. |
| 2010/0089207 | A1 | 4/2010 | Salanda |
| 2014/0260826 | A1* | 9/2014 | Eggert .................... B25B 13/06 81/177.85 |
| 2018/0215021 | A1 | 8/2018 | Hargrove |
| 2018/0311802 | A1 | 11/2018 | Kemppainen |
| 2019/0022838 | A1* | 1/2019 | Hutchison ........... B25B 27/0028 |
| 2019/0389040 | A1 | 12/2019 | Hargrove |

FOREIGN PATENT DOCUMENTS

| | | | |
|---|---|---|---|
| DE | 19845386 | A1 | 5/2000 |
| EP | 2977193 | | 7/2018 |
| GB | 1262661 | A | 2/1972 |
| KR | 101555320 | | 9/2015 |
| TW | 477742 | B | 3/2002 |

OTHER PUBLICATIONS

Combined Search and Examination Report for corresponding Application No. GB2209871.9 dated Dec. 21, 2022, 5 pages.

Taiwan Office Action for corresponding Application No. 11220635430 dated Jul. 4, 2023, 6 pages.

Canadian Office Action for corresponding Application No. 3, 166,674 dated Sep. 21, 2023, 5 pages.

Australian Patent Office, Examination Report issued in corresponding Application No. 2022204420, dated Mar. 18, 2024, 5 pp.

Leather Machinery, Leatherworker.net, Dikman: https://leatherworker.net/forum/topic/89000-i-bought-an-arbor-press-at-last/page/2, retrieved Jun. 13, 2024.

Chinese Patent Office, Second Office Action issued in corresponding Application No. 202210803535.7, dated Jun. 28, 2025, 18 pp.

Chinese Patent Office, Decision on Rejection issued in corresponding Application No. 202210803535.7, dated Sep. 15, 2025, 16 pp.

* cited by examiner

MACHINE PRESS ADAPTOR

TECHNICAL FIELD OF THE INVENTION

The present invention relates to an adaptor for a machine press.

BACKGROUND OF THE INVENTION

Machine presses, such as, for example, hydraulic, mechanical, electrical, and pneumatic powered presses, are often used for pressing operations, such as, for example, press fitting parts together, such as gears onto shafts and/or bearings into housings. These presses are often used in auto mechanic shops, machine shops, etc., and are capable of applying varying amounts of force, depending on size and construction. However, different applications require different drive adaptors and clearance. Typical machine presses use loose drive adaptors that are not coupled to the press cylinder or carriage of the machine press. In addition, some applications require special geometry adaptors such that technicians use sockets, pipe remnants, pieces of wood, used bearings, and many other various components as press adaptors to direct the force of the press cylinder.

Using loose press adaptors and improper drive adaptors is dangerous to the technicians in the surrounding area. It can also cause damage to the press, adaptors, and/or workpiece. For example, the press adaptors and/or drive adaptors may not be properly aligned with the press cylinder. Accordingly, upon application of the press force by the machine press, one or more of the loose press adaptors and drive adaptors can be launched from the press at a high rate of speed that could result in serious injury to technicians and/or nearby machinery. In addition, the component receiving the press force from the machine press could be damaged.

SUMMARY OF THE INVENTION

The present invention relates broadly to a machine press adaptor that releasably or removably couples a drive adaptor to a press cylinder or carriage of a machine press to prevent parts from being displaced under load while also removing the need for a technician to keep his hands on the adaptor(s) during operation. The invention also allows a user to use incremental driver adaptors that are coupled to the machine press adaptor. The quick connect/disconnect feature of the invention allows the user to quickly swap sizes and/or styles of the drive adaptors depending on the press operation. The press adaptor can also be quickly removed and installed on the press cylinder or carriage so that the machine press can still easily be used for operations that do not require a drive adaptor. Moreover, multiple extension shafts having varying lengths can be used to allow the machine press to be used in low clearance operations that require extended reach, such as, for example, pressing inside a cavity, thereby eliminating the need to press on various components, such as, for example, pipes, sockets, wood, etc., during a press operation.

The present invention broadly includes a machine press adaptor for a machine press having a press cylinder. The machine press adaptor includes a body adapted to removably couple to the press cylinder or carriage and an extension shaft having first and second opposing ends. The first end is removably coupled to the body, and the second end is adapted to couple to a drive adaptor.

In another embodiment, the present invention broadly includes a press having a press cylinder. The press assembly includes a drive adaptor and an adaptor. The adaptor includes a body designed to removably couple to the press cylinder or carriage and an extension shaft having opposing first and second ends. The first end is removably coupled to the body, and the second end is adapted to removably couple to the drive adaptor.

In another embodiment, the present invention broadly includes an adaptor for a press having a press cylinder or carriage. The adaptor includes a body having an open end adapted to receive the press cylinder and an aperture including an aperture groove, fasteners threadably coupled to the body and adapted to removably couple the body to the press cylinder or carriage, and an extension shaft having opposing first and second ends and first and second outwardly biased balls. The first end is received by the aperture and removably coupled to the body by the first ball engaging the aperture groove. The second end is adapted to removably couple to a drive adaptor by the second ball engaging a drive adaptor groove.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

DETAILED DESCRIPTION

Figure 1:
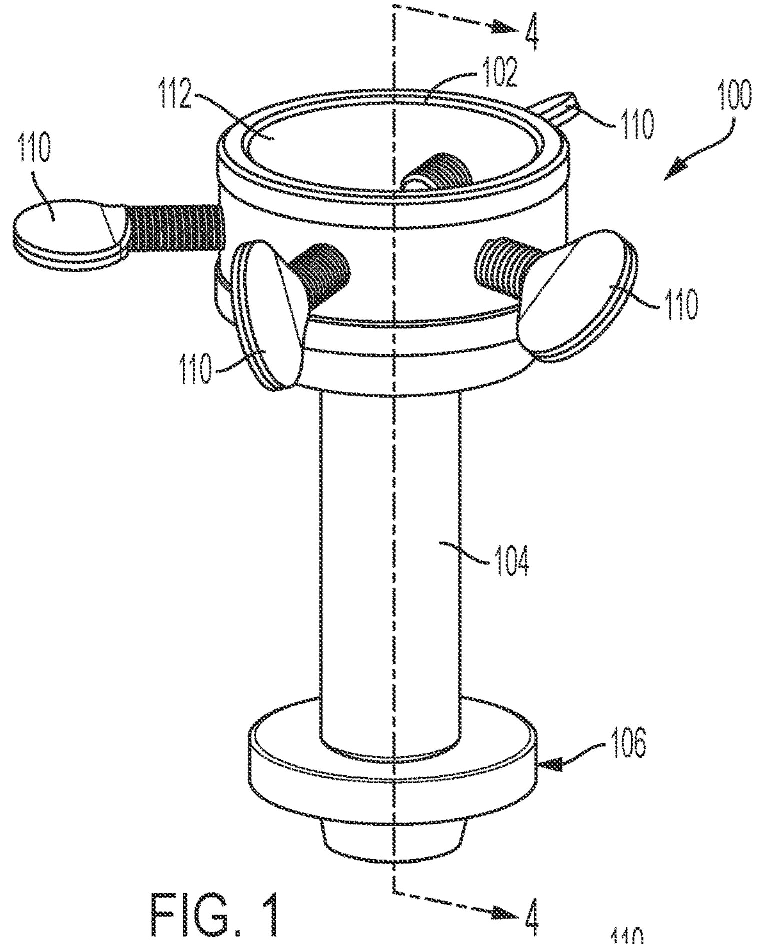
FIG. 1 is a perspective, assembled view of a machine press adaptor, according to an embodiment of the present invention.
Figure 2:
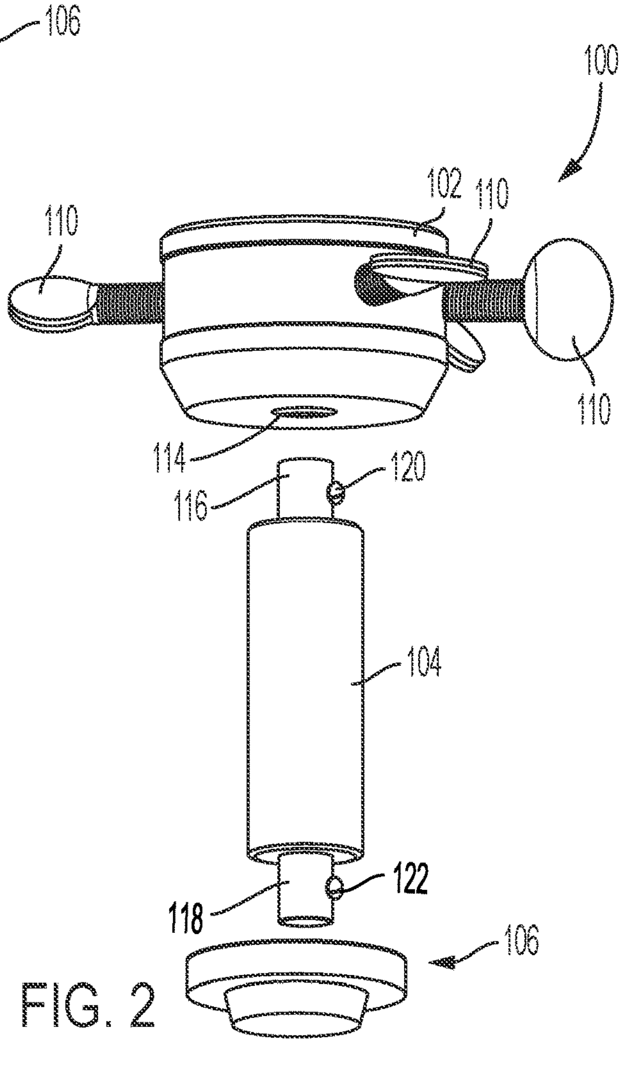
FIG. 2 is a perspective, partially exploded view of the adaptor of FIG. 1.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to a machine press adaptor that includes a body removably coupled to a press cylinder or carriage of a press machine via fasteners, such as, for example, bolts or thumbscrews. A quick connecting/disconnecting device, such as a ball detent mechanism, couples one end of an extension shaft to the body. The opposite end of the extension shaft also includes a connecting/disconnecting device, such as a ball detent mechanism, to couple to a drive adaptor, such as, for example, bushing drivers, bearing drivers, ball joint cups, or any other suitable drive adaptor that could be used in a press application. Multiple length extension shafts allows the machine press adaptor to be able to service different press operations including, but not limited to, short compact pressing operations and long reaching pressing operations, such as, for example, through a cavity or assembly. The machine press adaptor can be removed from the press cylinder or carriage quickly so the press can still be used for traditional pressing operations.

Figure 3:
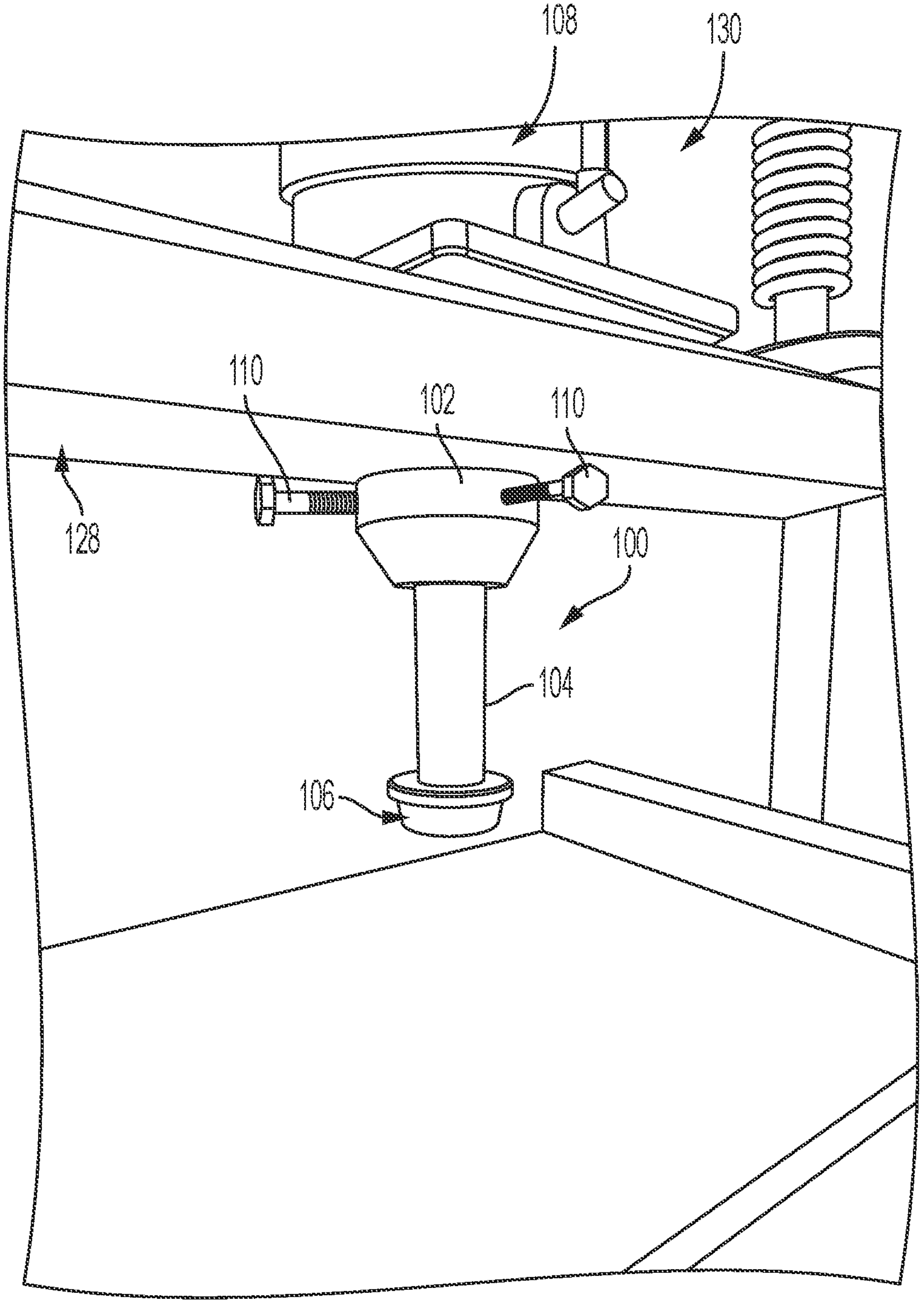
FIG. 3 is a perspective view of the adaptor of FIG. 1 coupled to an exemplary machine press and drive adaptor, according to an embodiment of the present invention.
Figure 4:
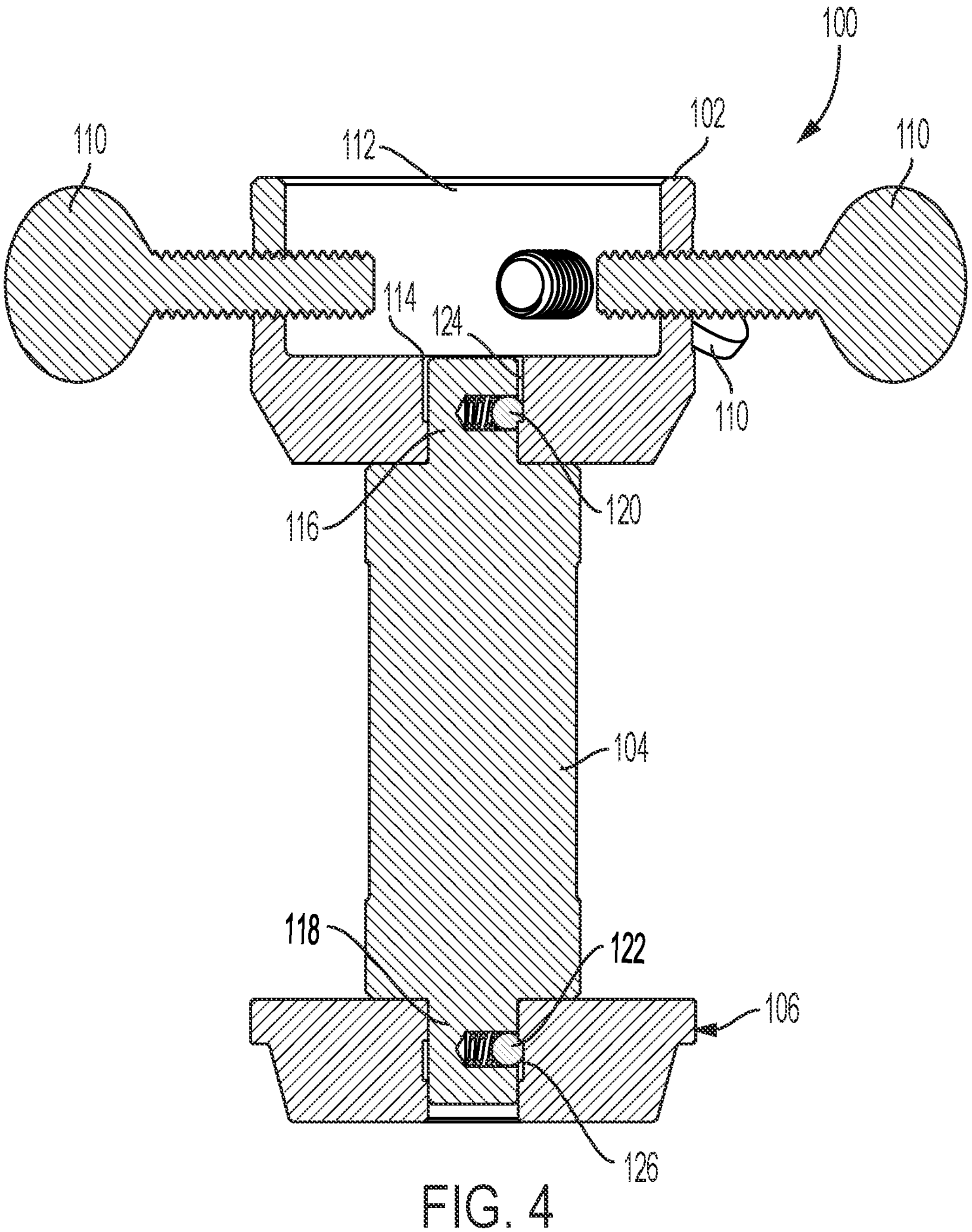
FIG. 4 is a section view taken along line 4-4 of FIG. 1.

Referring to FIGS. 1-4, a machine press adaptor 100 that includes a body 102 and an extension shaft 104. The machine press adaptor 100 is adapted to removably couple a drive adaptor 106 directly to a press cylinder 108 of a press machine 130 or a carriage 128 of the press machine 130 (as illustrated in FIG. 3). The drive adaptor 106 is a drive adaptor adapted to be used during a pressing operation, such as for example, bearing drivers, bushing drivers, ball joint cups, etc. The press cylinder 108 represents an input device such as, for example, hydraulic, mechanical, electrical, and pneumatic powered press, adapted to be used for pressing operations, such as, for example, press fitting interference fit parts together, such as gears onto shafts and/or bearings into housings.

The body 102 is adapted to removably couple directly to the press cylinder 108 or the carriage 128 of the press machine 130. In an embodiment, the body 102 is removably coupled to the press cylinder or carriage via fasteners 110, such as, for example, bolts or thumbscrews, threadably coupled to the body 102. Although four fasteners 110 are illustrated, the invention is not limited as such and any number of fasteners 110 may be used. The body 102 further includes an open end 112 adapted to receive the press cylinder 108 or carriage 128. The body 102 has a cross-sectional shape to correspond to the press cylinder 108 or carriage 128, for example, circular, square, or rectangular. In an embodiment, the body 102 further includes an aperture 114 adapted to receive the extension shaft 104.

The extension shaft 104 is an elongated member having opposing first 116 and second 118 ends. The first end 116 is adapted to removably couple to the body 102 at the aperture 114 via, for example, a first ball detent mechanism. For example, the first end 116 includes a first outwardly biased ball 120 adapted to engage a detent, such as, for example a groove 124 formed in the aperture 114. In an alternate embodiment, the aperture 114 includes an outwardly biased ball adapted to engage a detent or groove disposed on the first end 116. The second end 118 is adapted to removably couple to a drive adaptor 106 via a second ball detent mechanism. For example, the second end 118 includes a second outwardly biased ball 122 adapted to engage a detent, such as, for example, a groove 126 formed in the drive adaptor 106. In an alternate embodiment, the drive adaptor 106 includes an outwardly biased ball adapted to engage a detent or groove disposed on the second end 118. Accordingly, the drive adaptor 106 can be easily interchanged with other bushing drivers, bearing drivers, ball joint cups, or any other suitable drive adaptor that could be used in a press operation.

In an embodiment, the extension shaft 104 is one of a number of interchangeable extension shafts having respective unique lengths, thereby allowing the press machine 130 to be used in both short compact pressing operations and long reaching pressing operations, such as through a cavity or assembly that requires extended reach. Moreover, the machine press adaptor 100 can easily and quickly be removed from the press cylinder 108 or carriage 128 of the press machine 130 by loosening the fasteners 110, thereby allowing the press machine 130 to be used for traditional pressing operations.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. An adaptor for a press, comprising:

a body adapted to removably couple to a press cylinder or a carriage of the press, and including an aperture including an aperture groove; and an extension shaft having opposing first and second ends with respective first and second cross-sectional dimensions, a middle portion disposed between the first and second ends and having a middle portion cross-sectional dimension that is greater than the first and second cross-sectional dimensions, and a first outwardly biased ball disposed proximate to the first end, wherein the first end has a substantially circular cross-sectional shape and is disposed in the aperture and removably coupled to the body by the first outwardly biased ball engaging the aperture groove, and the second end is adapted to removably couple to a drive adaptor.

2. The adaptor of claim 1, further comprising fasteners threadably coupled to the body and adapted to removably couple the body to the press cylinder or carriage.

3. The adaptor of claim 2, wherein the fasteners are thumbscrews.

4. The adaptor of claim 1, wherein the body includes an open end adapted to receive the press cylinder or carriage.

5. The adaptor of claim 1, wherein the body has one of a circular, square, or rectangular cross-sectional shape.

6. The adaptor of claim 1, wherein the second end is adapted to removably couple to the drive adaptor via a second ball detent mechanism.

7. The adaptor of claim 1, wherein the extension shaft is one of a number of interchangeable extension shafts, and wherein each of the number of interchangeable extension shafts has a unique length.

8. A press comprising:

a drive adaptor;

an adaptor including:

a body adapted to removably couple to a press cylinder or a carriage of the press, and including an aperture including an aperture groove; and an extension shaft having opposing first and second ends with respective first and second cross-sectional dimensions, a middle portion disposed between the first and second ends and having a middle portion cross-sectional dimension that is greater than the first and second cross-sectional dimensions, and a first outwardly biased ball disposed proximate to the first end, wherein the first end has a substantially circular cross-sectional shape and is disposed in the aperture and removably coupled to the body by the first outwardly biased ball engaging the aperture groove, and the second end is adapted to removably couple to the drive adaptor.

9. The press of claim 8, wherein the adaptor further includes fasteners threadably coupled to the body and adapted to removably couple the body to the press cylinder or carriage.

10. The press of claim 9, wherein the fasteners are thumbscrews.

11. The press of claim 8, wherein the body includes an open end adapted to receive the press cylinder or carriage.

12. The press of claim 8, wherein the body has one of a circular, square or rectangular cross-sectional shape.

13. The press of claim 8, wherein the second end is adapted to removably couple to the drive adaptor via a second ball detent mechanism.

14. The press of claim 13, wherein the extension shaft is one of a number of interchangeable extension shafts, and wherein each of the number of interchangeable extension shafts has a unique length.

15. An adaptor for a press, comprising:

a body including a circular opening adapted to receive a press cylinder or a carriage of the press, and an aperture including an aperture groove;

fasteners threadably coupled to the body and adapted to extend into the circular opening to removably couple the body to the press cylinder or carriage; and an extension shaft having opposing first and second ends, a middle portion between the first and second ends, and first and second outwardly biased balls respectively disposed proximate to the first and second ends, wherein the first and second ends have respective first and second cross-sectional dimensions, the middle portion has a middle portion cross-sectional dimension that is greater than the first and second cross-sectional dimensions, and the first end has a substantially circular cross-sectional shape and is disposed in the aperture and removably coupled to the body by the first outwardly biased ball engaging the aperture groove, and the second end is adapted to removably couple to a drive adaptor by the second outwardly biased ball engaging a drive adaptor groove.

* * * * *